United States Patent
Johnson et al.

[11] 3,710,615
[45] Jan. 16, 1973

[54] ACOUSTIC PARTICLE CONCENTRATION MEASURING INSTRUMENT AND METHOD

[75] Inventors: Robert L. Johnson, Marina Del Rey; Kenneth R. Overoye; Pravin G. Bhuta, both of Torrence, all of Calif.

[73] Assignee: TRW Inc., Redondo Beach, Calif.

[22] Filed: March 25, 1971

[21] Appl. No.: 127,872

[52] U.S. Cl. .................73/61 R, 73/67.7, 340/236
[51] Int. Cl. .............................................G01n 29/02
[58] Field of Search .......73/61 R, 61.1 R, 67.6, 67.8; 340/236, 261

[56] References Cited

UNITED STATES PATENTS

| 2,280,226 | 4/1942  | Firestone........................73/67.8 |
| 2,966,056 | 12/1960 | Heller...........................73/61 R X |
| 3,093,998 | 6/1963  | Albertson et al. .................73/61 R |
| 3,269,172 | 8/1966  | McGaughey.......................73/61 R |
| 3,359,788 | 12/1967 | Colvin............................73/61.1 R |
| 3,553,636 | 1/1971  | Baird.............................73/61 R X |

FOREIGN PATENTS OR APPLICATIONS

| 180,845 | 5/1966 | U.S.S.R. ...........................73/61 R |
| 180,844 | 5/1966 | U.S.S.R. ...........................73/61 R |

Primary Examiner—Louis J. Capozi
Assistant Examiner—Joseph W. Roskos
Attorney—Daniel T. Anderson et al.

[57] ABSTRACT

A liquid or solid medium is acoustically examined to detect or measure the concentration of a selected entrained particle matter of different acoustic impedance than the medium and given average particle size by transmitting through the medium to acoustic transducer means acoustic wave energy of a selected frequency such that the wave energy is attenuated by scattering and diffraction by all the constituents of the medium down to and including the particle size of the selected matter, and comparing the transducer output voltage produced by the incident wave energy with a reference transducer output voltage produced by acoustic wave energy which is attenuated by all the constituents except the selected particulate matter to obtain a resultant voltage representing the concentration of the selected matter. This resultant voltage may be utilized to drive a meter or recorder for displaying concentration and/or an alarm for signalling a critical concentration. One disclosed embodiment of the invention is a single frequency system for use in applications where the medium contains only the selected particulate matter to be detected and employs an external reference voltage source. A second disclosed embodiment is a multiple frequency system for use where the medium contains more than one particulate matter and utilizes a transducer output as a reference voltage. A primary application of the invention involves measuring the concentration of oil in water.

13 Claims, 2 Drawing Figures

PATENTED JAN 16 1973

3,710,615

Robert L. Johnson
Kenneth R. Overoye
Pravin G. Bhuta
INVENTORS

BY

ATTORNEY

ACOUSTIC PARTICLE CONCENTRATION MEASURING INSTRUMENT AND METHOD

BACKGROUND OF THE INVENTION

1. Field of the Invention

This invention relates generally to the field of acoustic measurement and more particularly to a method of and an instrument for acoustically examining a liquid or solid medium to detect or measure the concentration of entrained particulate matter of different acoustic impedance than the medium and given average particle size.

2. Prior Art

In its broader aspects, the invention is concerned with detecting or measuring the concentration of any particulate matter in either a liquid or solid medium. It is significant to note in this regard that in the context of the present disclosure, the expression "particulate matter" refers to either a solid or liquid in particle or droplet form which may or may not normally be present in the medium and which may be either in the nature of a desirable or essential constituent or an undesirable or foreign constituent or contaminant. Acoustic particle concentration measuring methods and instruments are known. A selection of prior art U.S. Pat. Nos. in this general field is set forth below:

| | | |
|---|---|---|
| 2,817,967 | 3,093,998 | 3,269,172 |
| 2,968,357 | 3,133,445 | 3,344,658 |
| 2,966,056 | 3,220,261 | 3,359,788 |
| 3,040,562 | 3,222,928 | 3,373,600 |

As will appear from the ensuing description, the present acoustic measuring method and instrument is capable of many diverse applications. A primary use of the invention, however, involves measuring the concentration of oil in water. The invention will be disclosed in connection with this particular application.

One of the major sources of pollution of navigable waters by oil is discharge of oily water by ships. The main source of the oily water is ballast and bilge discharge and tanker washings. As a result of the 1963 International Conference on Oil Pollution, a limit of 100 ppm of oil and water discharged from ships was established. Given that the intent of both government and industry is to comply with this agreement its practical implementation is very difficult due to the lack of a reliable technique for measuring the oil content in discharged water. Besides ballast and bilge discharge from ships, oil refineries must discharge large quantities of water which might contain oil. In light of the present public attitude toward pollution, good business practice dictates that refining companies restrict their discharge to water containing less than 100 ppm oil.

Numerous techniques have been tried in an attempt to accurately monitor the amount of oil in water in the low (0-200 ppm) range. Principal among these are: (1) the capacitance probe, (2) attenuation of optical beams, (3) the attenuation by absorption and scattering of electromagnetic radiation in both the infrared and ultraviolet bands.

None of the systems based on these techniques perform satisfactorily at present and most proposed systems suffer disadvantages inherent in the basic method which would seem to preclude the development of an improved system.

SUMMARY OF THE INVENTION

The present invention provides a novel acoustic method and instrument for acoustically examining a liquid or solid acoustic transmission medium to detect the presence or measure the concentration in the medium of selected liquid or solid particles of different acoustic impedance than the medium and given mean particle diameter. The acoustic instrument has an acoustic source and an acoustic receiver to be acoustically coupled to the medium for transmission of acoustic wave energy from the source, through the medium, to the receiver. The receiver includes acoustic transducer means for converting the incident acoustic wave energy to a corresponding fluctuating electrical output voltage. Also included in the instrument are means for producing a reference voltage and means for comparing the voltages to obtain a resultant voltage representing the difference between the output and reference voltages.

The acoustic source is driven at a selected acoustic frequency such that acoustic wave energy is transmitted through the acoustic medium to the receiver with a half wavelength approximating the mean diameter of the selected particles to be detected or whose concentration is to be measured. Accordingly, during its passage through the medium, the acoustic wave energy is attenuated, by scattering and diffraction, by all the particles present in the medium down to the diameter of and including the selected particles. The reference voltage means provides a reference voltage representing the acoustic receiver output produced by acoustic wave energy from the acoustic source which is attenuated by all the particles present in the medium down to but not including the particle diameter of the selected particles. The difference in amplitude between the two acoustic wave energies arriving at the acoustic receiver, and hence the resultant voltage from the voltage comparison means of the instrument, thus represent the attenuation produced by and therefore the concentration of the selected particles in the medium. This resultant voltage may be utilized to drive a meter or recorder for displaying the particle concentration and/or to actuate an alarm for signaling a critical concentration.

Two inventive embodiments are disclosed. One embodiment is a single frequency system for use in applications where the acoustic medium may contain only the selected particles to be detected or measured such as oil droplets in water. In this system only a single acoustic frequency, having a half wavelength approximating the mean diameter of the particles, is transmitted through the medium. The output of the acoustic receiver is amplified and converted to a corresponding d.c. output voltage. The reference voltage is a d.c. voltage provided by an external reference voltage source which is adjusted to a reference voltage level equal to the receiver d.c. output voltage when the acoustic medium is totally free of the selected particles to be detected. Accordingly, the difference between the eternal reference voltage and the instantaneous receiver d.c. output voltage represents the attenuation produced by and hence the concentration of the selected particles. The voltage comparison means is an electrical differencing circuit which produces a difference voltage equal to the difference between the references and receiver output voltages. This difference voltage drives a meter and recorder for displaying concentration and an alarm for signaling a critical concentration.

The second disclosed system is a multiple frequency system for use in applications where the acoustic medium may contain particles of different mean diameter, such as oil droplets and larger particles of sand, rock, dirt or the like. In this instrument, at least two different acoustic frequencies are transmitted through the acoustic medium. The half wavelength of the higher frequency approximates the mean diameter of the selected particles to be detected or measured. The half wavelength of the lower frequency is substantially greater than the mean diameter of the selected particles but equal to or less than the next larger particle mean diameter. The acoustic wave energy of the higher frequency is thus attenuated by all the entrained particles down to the diameter of and including the selected particles. The acoustic wave energy of the lower frequency is attenuated by all the particles of larger diameter than the selected particles. Accordingly, the difference in amplitude of the acoustic wave energy of the two frequencies arriving at the acoustic receiver represents the attenuation produced by and hence the concentration of the selected particles. The receiver d.c. output voltage produced by the lower frequency is employed as a reference voltage which is compared to the receiver d.c. output voltage produced by the higher frequency to obtain a difference voltage representing the concentration of the selected particles for operating a meter, recorder and/or alarm.

PREFERRED EMBODIMENTS OF THE INVENTION

Figure 1:
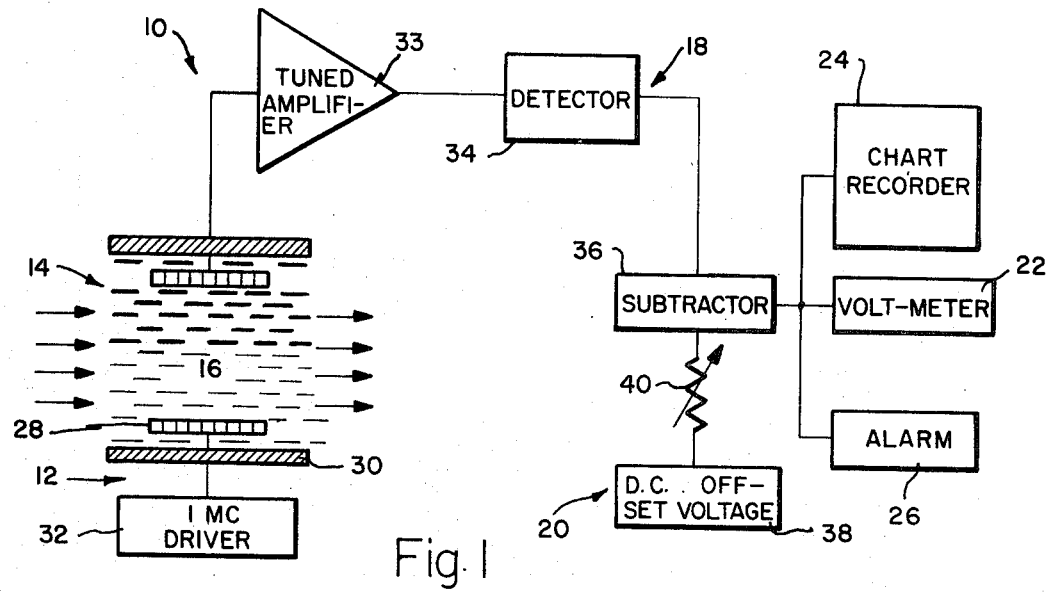
FIG. 1 is a diagram of a single frequency acoustic concentration measuring instrument according to the invention.

The acoustic instrument 10 of FIG. 1 has an acoustic source 12 and an acoustic receiver 14 to be acoustically coupled to an acoustic wave transmission medium 16 to be acoustically examined for the purpose of detecting the presence or measuring the concentration in the medium of selected particles of different acoustic impedance than the medium and given mean particle diameter. The acoustic source and receiver are spaced so that acoustic wave energy from the source is transmitted through the acoustic medium to the receiver. The acoustic receiver produces a fluctuating output voltage proportional to the intensity or magnitude of the wave energy incident on the receiver. This output voltage is fed to a voltage comparison circuit 18 which receives a reference voltage from a reference voltage source 20. The comparison circuit produces a resultant voltage which represents the difference between the receiver output voltage and the reference voltage. As will appear presently, this resultant or difference voltage also represents the concentration of selected particles within the acoustic medium 16. Connected to and actuated by the output of the comparison circuit 18 are a meter 22 and recorder 24 for displaying the particle concentration and an alarm 26 for signaling a critical concentration.

Briefly, in operation of the acoustic instrument 10, the acoustic source 12 is operated to transmit through the acoustic medium 16 acoustic wave energy having a half wavelength approximating the mean diameter of the selected particles, such that the wave energy is attenuated, by scattering and diffraction, by all the constituents of the medium down to the diameter of and including the selected particles to be measured. The reference voltage source 20 is adjusted to provide a reference voltage representing the output of the acoustic receiver with a known concentration of the selected particles in the medium, preferably zero concentration (i.e. pure medium). The comparison circuit 18 compares this reference voltage and the receiver output voltage when the acoustic wave energy is attenuated by the selected particles and produces a resultant or difference voltage representing the concentration of the selected particles in the medium.

The particular instrument 10 under discussion is a single frequency system which is intended for acoustically examining an acoustic medium which consists only of the medium itself and the selected particles, if any, to be detected or measured. In this case, the acoustic source 12 is initially operated at the selected acoustic frequency with a pure acoustic medium 16, i.e. a medium totally free of the selected particles, such that the receiver 14 produces an output voltage representing the acoustic wave energy incident on the receiver when no attenuation of the wave energy by the selected particles occurs. The reference voltage source 20 is set to obtain a null output from the comparison circuit 18. During normal instrument operation, the comparison circuit compares this reference voltage with the receiver output voltage to provide a resultant or difference voltage representing the concentration of the selected particles. As noted earlier, a primary use of the present acoustic instrument is monitoring the concentration of oil in water. The particular instrument 10 shown in FIG. 1 is intended for this application. In this regard, it is significant to note that oil entrained in water exists in the form of minute droplets having a mean diameter on the order of a few microns. These droplets constitute the particles whose concentration is measured by the instrument.

Referring now in greater detail to the illustrated instrument, the acoustic source 12 comprises an acoustic wave generating transducer 28 within a conduit 30 for conveying the acoustic medium 16, i.e. water, to be examined or monitored and a driver 32 for the transducer. The acoustic receiver 14 comprises an acoustic wave receiving transducer within the conduit opposite the source transducer. The water 16 flows between the transducers, as shown.

The voltage comparison circuit 18 includes a tuned amplifier 33 coupled to the output of the receiving transducer 14, a detector 34 coupled to the output of the amplifier, and a voltage differencer or subtractor 36 coupled to the output of the detector. Amplifier 33 is tuned to a narrow frequency band about the frequency of the driver 32 and amplifies the transducer output over the range of this frequency band. The detector 34 converts or rectifies the amplifier output to a corresponding d.c. output voltage which is applied to the differencer 36. The reference voltage source 20 includes a d.c. voltage source 38 coupled to the difference 36 and null adjustment 40 for regulating the d.c. reference voltage level to the differencer. The differencer 36 produces a resultant d.c. voltage equal to the difference between the receiver d.c. output voltage and d.c. reference voltage applied to the differencer. This resultant or difference voltage is applied to the meter 22, recorder 24, and alarm 26.

In operation of the illustrated oil concentration measuring instrument 10, the driver 32 of the acoustic source 12 is tuned to an acoustic frequency whose half wavelength approximates or is less than the mean diameter of the oil particles or droplets to be measured. This driving frequency may be on the order of 1 megacycle. The instrument is initially calibrated by operating the instrument with clean water passing through the conduit 30, that is water of the kind to be acoustically examined but totally free of any oil. During this calibration run, acoustic wave energy at the tuned frequency of the driver 32 is transmitted through the water from the acoustic source transducer 28 to the acoustic receiver transducer 14. The fluctuating output voltage of the receiving transducer is amplified by the tuned amplifier 33 within a narrow band about the tuned frequency of the acoustic driver 32 and then converted to a corresponding d.c. output voltage by the detector 34. This d.c. output voltage and the reference voltage from the reference source 20 are applied to the differencer 36. The adjustment means 40 of the reference source is adjusted to obtain a null output from the differencer.

During normal operation of the instrument 10, the water to be examined or monitored for oil passes through the conduit 30. The acoustic source 12 is again operated to transmit acoustic wave energy at the tuned frequency of the driver 32 through the water to the acoustic receiver 14. During its passage through the water, the wave energy is attenuated, by scattering and diffraction, by any oil particles or droplets present in the water. It will be understood by those versed in the art that this scattering and diffraction occurs because of the earlier described relationship between the half wavelength of the wave energy and the mean diameter of the oil droplets. The amount of attenuation and hence the amplitude of the acoustic wave energy incident on and the output of the acoustic receiver 14 are proportional to the concentration of the oil droplets in the water.

The d.c. output voltage from the acoustic receiver 14 and the d.c. reference voltage from the reference source 20 are subtracted in the differencer 36 to obtain a difference voltage representing the difference between the output and reference voltages. Since the reference voltage represents the receiver output with no acoustic attenuation by oil droplets and the receiver d.c. output voltage represents the receiver output after acoustic attenuation by any oil droplets present in the water, the difference between these voltages, and hence the difference voltage from the differencer represent the oil concentration in the water. The meter 22 is calibrated to display and the recorder 24 is calibrated to record the oil concentration. The alarm 26 is set to be triggered at a preset difference voltage level corresponding to a selected or critical oil concentration.

Figure 2:
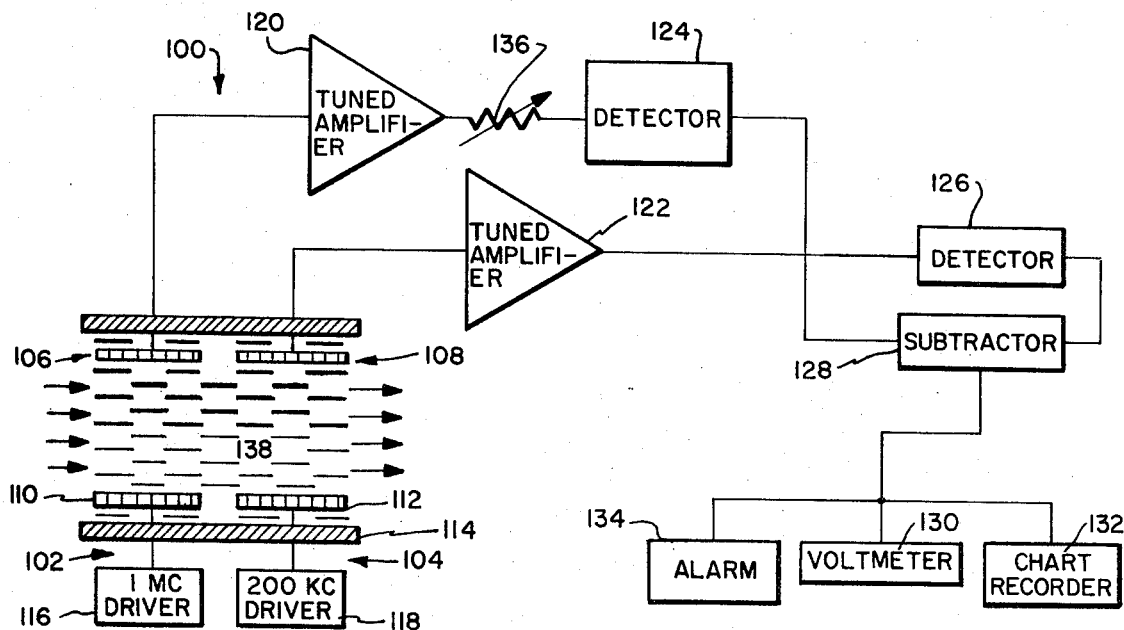
FIG. 2 is a diagram of a dual frequency acoustic concentration measuring instrument according to the invention.

In many oil concentration measurement applications, the water may contain secondary contaminants in addition to and of a larger mean diameter than the oil droplets, such as sand, bits of rock, etc. The modified acoustic measuring instrument 100 of FIG. 2 is designed for use in these latter applications. Instrument 100 has two acoustic sources 102, 104 and two acoustic receivers 106, 108. The acoustic sources include acoustic transducers 110, 112 arranged side by side within a conduit 114 and drivers 116, 118 for the transducers. The acoustic receivers comprise acoustic transducers arranged side by side within the conduit, directly opposite the source transducers. The receiver outputs are amplified by tuned amplifiers 120, 122, converted to corresponding d.c. output voltages by detectors 124, 126, and then applied to a differencer 128. Amplifiers 120, 122 are tuned to narrow frequency bands about the frequencies of their respective acoustic source 102, 104. The output of the differencer is applied to a meter 130, recorder 132, and alarm 134. Between the amplifier 120 and detector 124 for the acoustic receiver 106 are null adjustment means 136 for adjusting the receiver output voltage applied to the detector.

In operation of the instrument 100, the water 138 to be acoustically examined passes through the conduit 114 and between the source and receiving transducers 110, 112, 106, and 108. Assuming that the water contains only oil droplets and larger secondary contaminants such as sand, bits of rock and the like, the driver 116 of the acoustic source 102 is tuned to an acoustic frequency whose half wavelength approximates or is less than the mean diameter of the oil droplets. The driver 118 of the acoustic source 104 is tuned to a lower frequency whose half wavelength is substantially larger than the mean diameter of the oil droplets and approximately equal to or less than the mean diameter of the smallest secondary contaminant present in the water. In the case of water from bilges, ballast tanks, and the like, the drivers 116, 118 may be tuned to frequencies on the order of 1 megacycle and 200 kilocycles, respectively.

The acoustic wave energy from the sources 102, 104 is transmitted through the water to the acoustic receivers 106, 108. From the above discussion of the driving frequencies, it will be understood that the high frequency acoustic waves from the acoustic source 102 are attenuated, by scattering and diffraction, by all the constituents present in the water including the secondary contaminants and any oil droplets entrained in the water. The low frequency acoustic wave energy from the acoustic source 104, on the other hand, is attenuated by all the constituents except any oil droplets which may be entrained in the water. In other words, the high frequency "sees" everything present in the water, while the low frequency "sees" everything except the oil. Accordingly, the difference in intensity of the wave energy incident on the acoustic receivers represents the attenuation produced by oil droplets and thus the concentration of the oil droplets.

In the dual frequency instrument under discussion, the d.c. output voltage from the low frequency acoustic receiver 108 which receives acoustic wave energy attenuated by only the secondary contaminants in the water provides a reference voltage. This reference voltage and the d.c. output voltage from the high frequency acoustic receiver 106 are applied to the differencer 128 which produces a resultant voltage equal to the difference between the output and reference voltages. This difference voltage is applied to the meter 130, recorder 132, and alarm 134.

The dual frequency instrument 100 is initially calibrated by operating the instrument with water passing through the conduit 114 which contains the normal concentration of secondary contaminants but is totally free of oil. Under these conditions, both acoustic frequencies are attenuated only by the secondary contaminants. The null adjustment means 136 is adjusted to a null position wherein the reference voltage from receiver 106 and d.c. output voltage from receiver 108 are equal and the differencer 128 produces a null difference voltage. During normal operation, the high frequency acoustic wave energy is attenuated by any oil present in the water, thereby reducing the d.c. output voltage of the high frequency receiver 106 by an amount related to the oil concentration. The difference voltage from the differencer 128 then represent the oil concentration. The meter 130 and recorder 132 are calibrated to display and record this oil concentration, and the alarm 134 is set to be actuated on response to a preset oil concentration.

It will be immediately evident to those versed in the art that the measuring technique embodied in the dual frequency instrument 1100 may be extended to other frequencies to permit measurement of particle concentrations in several particle diameter ranges. In each measurement, one frequency, the lower reference voltage frequency, is selected to have a half wavelength substantially greater than the mean diameter of the particles to be detected but equal to or less than the diameter of the next larger particles. The higher frequency is selected to have a half wavelength approximating the diameter of the particles to be measured.

What is claimed as new in support of Letters Patent is:

1. An instrument for acoustically examining an acoustic transmission medium containing a first particulate constituent having a different acoustic impedance than the medium to detect a second particulate constituent having an acoustic impedance differing from those of both said medium and first constituent and a mean particle diameter smaller than the first constituent, comprising:

an acoustic receiver comprising transducer means to be acoustically coupled to said medium;
    an acoustic source comprising transducer means to be acoustically coupled to said medium for transmitting acoustic wave energy through said medium to said receiver at two different selected acoustic frequencies such that the higher frequency has a half wavelength approximating the mean particle diameter of said second constituent and the lower frequency has a half wavelength substantially greater than said latter particle diameter and approximating or less than the mean particle diameter of said first constituent, whereby both constituents when present in said medium attenuate the acoustic wave energy of higher frequency by scattering and diffraction by an amount related to the concentrations of the constituents, and said first constituent attenuates the acoustic wave energy of the lower frequency by an amount related to the concentration of said first constituent;
    said receiver producing two output voltages proportional to the incident acoustic wave energy at said two frequencies, respectively;
    circuit means connected to said receiver for producing a resultant voltage representing the difference between said output voltages; and
    means for nulling said resultant voltage at a selected concentration of said second constituent in said medium.

2. An acoustic instrument according to claim 1 wherein:
    said nulling means comprises means for nulling said resultant voltage with said medium totally devoid of said second constituent, whereby said selected concentration is zero concentration.

3. An acoustic instrument according to claim 1 wherein:
    said medium is water, said first constituent is particulate matter such as sand, bits of rock, and the like, and said second constituent is oil.

4. An acoustic instrument according to claim 1 including:
    readout means connected to said circuit means for providing a readout corresponding to said resultant voltage.

5. An acoustic instrument according to claim 1 wherein:
    said circuit means includes amplifiers tuned to narrow frequency bands about said selected frequencies, respectively, for amplifying the output voltages of said receiver detectors for converting the outputs of said amplifiers to corresponding d.c. output voltages, and differencing means for producing a d.c. voltage representing the difference between said d.c. output voltages.

6. An acoustic instrument according to claim 1 wherein:
    said acoustic source comprises two separate acoustic transducers which are driven at said selected frequencies, respectively; and
    said receiver comprises two separated transducers for receiving acoustic wave energy from said source transducers, respectively.

7. An acoustic instrument according to claim 1 wherein:
    said nulling means comprises means for nulling said resultant voltage with said medium totally devoid of said second constituent, whereby said selected concentration is zero concentration;
    said circuit means includes amplifiers tuned to narrow frequency bands about said selected frequencies, respectively, for amplifying the output voltages of said receiver at said driving frequencies, detectors for converting the outputs of said amplifiers to said corresponding d.c. output voltages, and differencing means for producing a d.c. difference voltage representing the difference between said d.c. output voltages;

said source comprises two separated acoustic transducers which are driven at said selected frequencies, respectively;

said receiver comprises two separated transducers for receiving acoustic wave energy from said source transducers, respectively; and readout means connected to said differencing means for providing a readout corresponding to said resultant voltage.

8. An acoustic instrument according to claim 7 wherein:

said medium is water, said first constituent is particulate matter such as sand, bits of rock and the like, and said second constituent is oil.

9. The method of acoustically examining a medium containing a first particulate constituent having a different acoustic impedance than the medium to detect a second particulate constituent having an acoustic impedance differing from those of both said medium and first constituent and a mean particle diameter smaller than the first constituent, which comprises the steps of:

transmitting through said medium acoustic wave energy of two different selected acoustic frequencies such that the higher frequency has a half wavelength approximating the mean particle diameter of said second constituent and the lower frequency has a half wavelength substantially greater than said latter particle diameter and approximating or less than the mean particle diameter of said first constituent, whereby both constituents when present in the medium attenuate the acoustic wave energy of higher frequency by scattering and diffraction by amounts related to the concentration of the constituents, and said first constituent attenuates the acoustic wave energy of lower frequency by an amount related to the concentration of said first constituent;

receiving the acoustic wave energy of each frequency after passage through said medium and producing output voltages related to the received wave energy of the two frequencies, respectively;

producing a resultant voltage representing the difference between said output voltages; and nulling said resultant voltage at a given concentration of said second constituent, whereby said resultant voltage represents the concentration of said second constituent in said medium.

10. The method of claim 9 wherein:

said resultant voltage is nulled with said medium totally devoid of said second constituent, whereby said selected concentration is zero concentration.

11. The method of claim 9 wherein:

said medium is water, said first constituent is particulate matter such as sand, bits of rock and the like, and said second constituent is oil.

12. An instrument for acoustically examining an acoustic transmission medium containing a first particulate constituent having a different acoustic impedance than the medium to detect a second particulate constituent having an acoustic impedance differing from those of both said medium and first constituent and a mean particle diameter smaller than the first constituent, comprising:

An acoustic receiver comprising transducer means to be acoustically coupled to said medium;

an acoustic source comprising transducer means to be acoustically coupled to said medium for transmitting acoustic wave energy through said medium to said receiver at two different selected acoustic frequencies such that the higher frequency has a half wavelength approximating the mean particle diameter of said second constituent and the lower frequency has a half wavelength substantially greater than said latter particle diameter and approximating or less than the mean particle diameter of said first constituent, whereby both constituents when present in said medium attenuate the acoustic wave energy of higher frequency by scattering and diffraction by an amount related to the concentrations of the constituents, and said first constituent attenuates the acoustic wave energy of the lower frequency by an amount related to the concentration of said first constituent; and said receiver producing two output voltages proportional to the incident acoustic wave energy at said two frequencies, respectively, the difference between said output voltages being proportional to the concentration of said second constituent.

13. The method of acoustically examining a medium containing a first particulate constituent having a different acoustic impedance than the medium to detect a second particulate constituent having an acoustic impedance differing from those of both said medium and first constituent and a mean particle diameter smaller than the first constituent, which comprises the steps of:

transmitting through said medium acoustic wave energy of two different selected acoustic frequencies such that the higher frequency has a half wavelength approximating the mean particle diameter of said second constituent and the lower frequency has a half wavelength substantially greater than said latter particle diameter and approximating or less than the mean particle diameter of said first constituent, whereby both constituents when present in the medium attenuate the acoustic wave energy of higher frequency by scattering and diffraction by amounts related to the concentration of the constituents, and said first constituent attenuates the acoustic wave energy of lower frequency by an amount related to the concentration of said first constituent; and receiving the acoustic wave energy of each frequency after passage through said medium and producing output voltages related to the received wave energy of the two frequencies, respectively, the difference between said output voltages being proportional to the concentration of said second constituent.

* * * * *